United States Patent
Sugamoto et al.

(10) Patent No.: US 7,596,421 B2
(45) Date of Patent: Sep. 29, 2009

(54) PROCESS CONTROL SYSTEM, PROCESS CONTROL METHOD, AND METHOD OF MANUFACTURING ELECTRONIC APPARATUS

(75) Inventors: Junji Sugamoto, Yokosuka (JP); Yukihiro Ushiku, Yokohama (JP); Kazutaka Akiyama, Matsudo (JP); Shoichi Harakawa, Yokohama (JP)

(73) Assignee: Kabushik Kaisha Toshiba, Tokyo (JP)

( * ) Notice: Subject to any disclaimer, the term of this patent is extended or adjusted under 35 U.S.C. 154(b) by 325 days.

(21) Appl. No.: 11/471,675

(22) Filed: Jun. 21, 2006

(65) Prior Publication Data

US 2006/0287754 A1 Dec. 21, 2006

(30) Foreign Application Priority Data

Jun. 21, 2005 (JP) ............................. 2005-180659
Sep. 20, 2005 (JP) ............................. 2005-272019

(51) Int. Cl.
G06F 19/00 (2006.01)
(52) U.S. Cl. ......................... 700/121; 700/109; 700/108
(58) Field of Classification Search ................. 700/108, 700/109, 121; 438/14; 702/188
See application file for complete search history.

(56) References Cited

U.S. PATENT DOCUMENTS 6,703,250 B2 3/2004 Chiu
2002/0056700 A1 5/2002 Ohmori
2003/0033120 A1* 2/2003 Chiou ......................... 702/188
2005/0022932 A1 2/2005 Kagoshima et al.
2005/0154482 A1* 7/2005 Tomoyasu .................. 700/108

FOREIGN PATENT DOCUMENTS

| JP | 10-275753 | 10/1998 |
| JP | 2000-252179 | 9/2000 |
| JP | 2002-151465 | 5/2002 |
| JP | 2002-312014 | 10/2002 |
| JP | 2005-19808 | 1/2005 |

* cited by examiner

*Primary Examiner*—Albert DeCady
*Assistant Examiner*—Steven R Garland
(74) *Attorney, Agent, or Firm*—Finnegan, Henderson, Farabow, Garrett & Dunner, L.L.P.

(57) ABSTRACT

A process control system includes a client computer which prepares a correlation between a reference monitored value of apparatus information and a feature quantity, a manufacturing execution system which prepares a processing recipe describing, as a first setting value in an actual manufacturing process, a value of the control parameter, an apparatus information collection section which collects an objective monitored value of the apparatus information in operation of the actual manufacturing process with the first setting value, a feature quantity calculation section which calculates a value of a feature quantity corresponding to the objective monitored value based on the correlation, a parameter calculation section which calculates a second setting value in the actual manufacturing process on the basis of the value of the feature quantity, and an apparatus control unit which changes the processing recipe with the second setting value being as a setting value of the second step.

11 Claims, 10 Drawing Sheets

FIG. 2
- S160 — poly_SiCVD
- S161 — ARCCVD
- S162 — Photolithography
- S163 — Resist width measurement
- S164 — Slimming RIE
- S165 — Mask width measurement
- S166 — Gate RIE
- S167 — Finished width measurement
FIG. 3
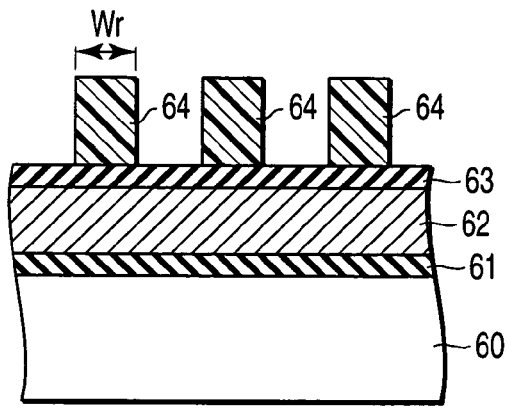
FIG. 4
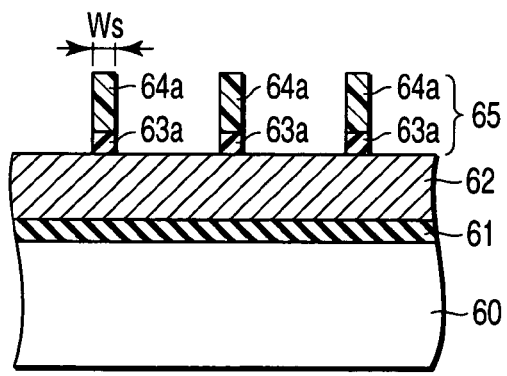
FIG. 5
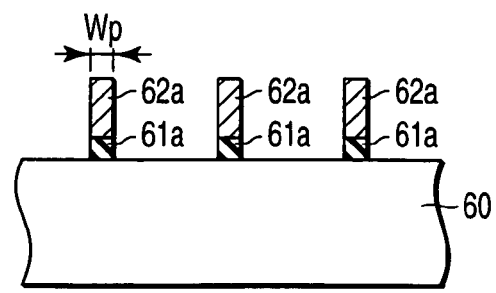

FIG. 11
S180 — Thermal oxidation
S181 — Si3N4 CVD
S182 — Photolithography
S183 — Deep trench RIE
S184 — TEOS CVD
S185 — Width measurement
S186 — a-Si CVD
S187 — Thickness measurement
S188 — Recess RIE
S189 — Finished depth measurement
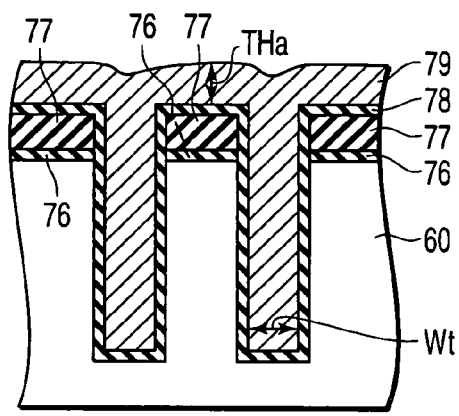
FIG. 12
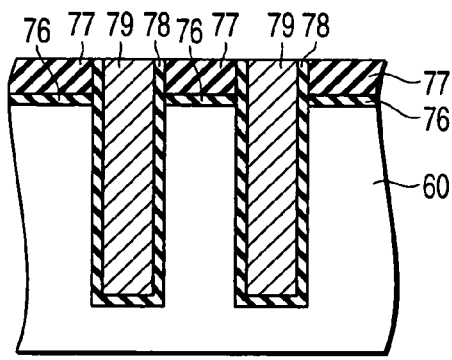
FIG. 13
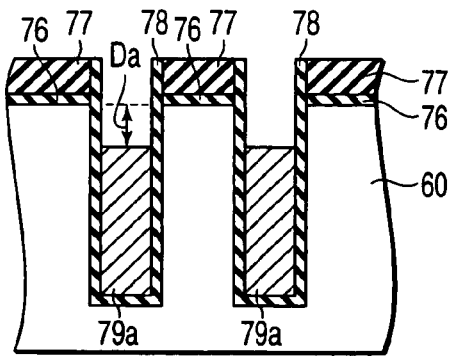
FIG. 14

PROCESS CONTROL SYSTEM, PROCESS CONTROL METHOD, AND METHOD OF MANUFACTURING ELECTRONIC APPARATUS

CROSS-REFERENCE TO RELATED APPLICATIONS

This application is based upon and claims the benefit of priority from prior Japanese Patent Applications No. 2005-180659, filed Jun. 21, 2005; and No. 2005-272019, filed Sep. 20, 2005, the entire contents of both of which are incorporated herein by reference.

BACKGROUND OF THE INVENTION

1. Field of the Invention

The present invention relates to a process of manufacturing an electronic apparatus, and in particular, to a process control system which controls a manufacturing process, a process control method, and a method of manufacturing an electronic apparatus.

2. Description of the Related Art

In order to realize high-performance electronic apparatuses, a manufacturing process with high accuracy, uniformity, and reproducibility is required. In electronic apparatuses such as semiconductor integrated circuits (ICs) and liquid crystal displays (LCDs), miniaturization and multi-layer manufacturing have progressed, and a level of integration has been increased dramatically in order to achieve high-functionality and high-speed performance. For example, in semiconductor apparatuses such as large-scale integrated circuits (LSIs), which are formed of multi-layered micropatterns, it has been made difficult to control the manufacturing process in accordance with the miniaturization thereof. Therefore, an attempt has been made to improve process capability run-to-run (RTR) control by which feedforward (FF) control or feedback (FB) control is carried out between processes or in a process (for example, refer to Jpn. Pat. Appln. KOKAI Publication Nos. 10-275753, 2000-252179 and 2002-151465).

For example, in a trench capacitor manufacturing process, a deep trench is filled up by depositing an amorphous silicon (a-Si) film on the surface of a substrate having a deep trench formed thereon by chemical vapor deposition (CVD) or the like. Thereafter, the a-Si film is etched to a predetermined depth by recess etching such as reactive ion etching (RIE). Usually, the depth of the recess is controlled by controlling an etching time of RIE. In order to control the recess depth precisely, an etching end-point of the a-Si film deposited on the surface of the substrate is detected. An etching rate is calculated on the basis of an end-point detection time from a start of etching to an end-point detection. An etching time for the a-Si film embedded in the deep trench is determined on the basis of a calculated etching rate.

However, an end-point detection time is influenced by not only an etching rate but also a thickness of a deposited a-Si film. Unevenness in a deposited film thickness is brought about among substrates or lots due to variations in CVD conditions for a-Si films. For this reason, even if an etching time for an a-Si film embedded in a deep trench is controlled on the basis of an end-point detection time, a recess depth cannot be controlled with high accuracy. As a result, the process capability for manufacturing a trench capacitor is reduced, which degrades a manufacturing yield.

Also, conventionally, in manufacture of semiconductor apparatuses, a parameter varying every run with respect to a process having a poor capability, for example, an etching rate or the like, is detected by quality control (QC) measurement after the process is completed. The process capability is improved to thereby increase a yield of semiconductor chips by RTR control using a QC measurement value.

There are cases in which a QC measurement value of a parameter varying every run is made to be an abnormal value different from a tendency of the lot in some of wafers in a lot during processing. Because QC measurement is not carried out on all the wafers in the lot, abnormal values brought about in some of wafers cannot be detected. When such a QC measurement value including an abnormal value is used, FB control or the like does not function effectively. As a result, improvement in control accuracy is made insufficient, which degrades a yield of semiconductor apparatus.

BRIEF SUMMARY OF THE INVENTION

According to an aspect of the present invention, there is provided a process control system comprising:

a client computer which prepares a correlation between a reference monitored value of apparatus information indicating a processing state of a manufacturing apparatus in a reference manufacturing process with respect to a reference wafer, and a feature quantity obtained from a control parameter for controlling the manufacturing apparatus and a finished form in the reference manufacturing process;

a manufacturing execution system which prepares a processing recipe describing, as a first setting value of a first step in an actual manufacturing process with respect to an objective wafer, a value of the control parameter calculated on the basis of a dimension of a processing objective structure in the actual manufacturing process;

an apparatus information collection section which collects an objective monitored value of the apparatus information from the manufacturing apparatus in operation of the actual manufacturing process with the first setting value;

a feature quantity calculation section which calculates a value of a feature quantity corresponding to the objective monitored value on the basis of the correlation;

a parameter calculation section which calculates a second setting value of a second step in the actual manufacturing process following the first step of the actual manufacturing process on the basis of the value of the feature quantity corresponding to the objective monitored value; and an apparatus control unit which changes the processing recipe with the second setting value being as a setting value of the second step.

According to another aspect of the present invention, there is provided a process control system comprising:

a monitor unit which monitors apparatus information indicating a processing state of a manufacturing apparatus;

an apparatus information collection unit which collects a monitored value of the apparatus information from the monitor unit in operation of a manufacturing process;

a correlation preparation unit which prepares a correlation between a test monitored value of the apparatus information in a test manufacturing process with respect to a test wafer, and a feature quantity obtained from a processing parameter for controlling the manufacturing apparatus and a finished form in the test manufacturing process;

a process management unit which calculates a setting value of the processing parameter in the objective manufacturing process on the basis of at least one of a plurality of estimated values of the feature quantity and a dimension of a processing objective structure in an objective manufacturing process with respect to an objective wafer, said plurality of estimated values being calculated on the basis of the correlation with respect to a plurality of reference monitored values of the apparatus information except for abnormal values in a distribution of said plurality of reference monitored values in a reference manufacturing process with respect to a plurality of reference wafers; and an apparatus control unit which controls the manufacturing apparatus in accordance with a processing recipe having the setting value described in a processing step in the objective manufacturing process.

According to a further aspect of the present invention, there is provided a process control method comprising:

preparing, by a client computer, a correlation between a reference monitored value of apparatus information indicating a processing state of a manufacturing apparatus in a reference manufacturing process with respect to a reference wafer, and a feature quantity obtained from a control parameter for controlling the manufacturing apparatus and a finished form in the reference manufacturing process;

preparing, by a manufacturing execution system, a processing recipe describing, as a setting value of a first step in an actual manufacturing process with respect to an objective wafer, a first setting value of the control parameter calculated on the basis of a dimension of a processing objective structure in the actual manufacturing process;

collecting, by an apparatus information collection section, an objective monitored value of the apparatus information from the manufacturing apparatus in operation of the actual manufacturing process with the first setting value;

calculating, by a feature quantity calculation section, a value of a feature quantity corresponding to the objective monitored value on the basis of the correlation;

calculating, by a parameter calculation section, a second setting value of a second step in the actual manufacturing process following the first step in the actual manufacturing process on the basis of the value of the feature quantity corresponding to the objective monitored value; and changing, by an apparatus control unit, the processing recipe with the second setting value being as a setting value of the second step.

According to a still further aspect of the present invention, there is provided a process control method comprising:

preparing, by executing a test manufacturing process with respect to a test wafer, a correlation between a test monitored value of apparatus information indicating a processing state of a manufacturing apparatus and a feature quantity obtained from a processing parameter for controlling the manufacturing apparatus and a finished form in the test manufacturing process;

acquiring, by executing a reference manufacturing process with respect to a plurality of reference wafers, a plurality of reference monitored values of the apparatus information with respect to said plurality of reference wafers;

determining abnormal values in a distribution of said plurality of reference monitored values;

calculating on the basis of the correlation a plurality of estimated values of the feature quantity respectively corresponding to said plurality of reference monitored values except for the abnormal values;

calculating a setting value of the processing parameter in the objective manufacturing process on the basis of a dimension of a processing objective structure in an objective manufacturing process with respect to an objective wafer, and at least one of said plurality of estimated values; and preparing a processing recipe having the setting value described in a processing step in the objective manufacturing process.

According to a yet further aspect of the present invention, there is provided a method of manufacturing an electronic apparatus, comprising:

preparing, by executing a reference manufacturing process onto a reference wafer, a correlation between a reference monitored value of apparatus information indicating a processing state of a manufacturing apparatus, and a feature quantity obtained from a control parameter for controlling the manufacturing apparatus and a finished form in the reference manufacturing process;

preparing a processing recipe describing, as a first setting value of a first step in an actual manufacturing process with respect to an objective wafer, a value of the control parameter calculated on the basis of a dimension of a processing objective structure in the actual manufacturing process;

collecting an objective monitored value of the apparatus information from the manufacturing apparatus in operation of the actual manufacturing process with the first setting value;

calculating a value of a feature quantity corresponding to the objective monitored value on the basis of the correlation;

calculating a second setting value of a second step in the actual manufacturing process following the first step in the actual manufacturing process on the basis of the value of the feature quantity corresponding to the objective monitored value;

changing the processing recipe with the second setting value being as a setting value of the second step; and processing the objective lot by the manufacturing apparatus.

According to a more aspect of the present invention, there is provided a method of manufacturing an electronic apparatus, comprising:

preparing, by executing a test manufacturing process with respect to a test wafer, a correlation between a test monitored value of apparatus information indicating a processing state of a manufacturing apparatus, and a feature quantity obtained from a processing parameter for controlling the manufacturing apparatus and a finished form in the test manufacturing process;

collecting, by executing a reference manufacturing process with respect to a plurality of reference wafers, a plurality of reference monitored values of the apparatus information with respect to said plurality of reference wafers;

determining abnormal values in a distribution of said plurality of reference monitored values;

calculating on the basis of the correlation a plurality of estimated values of the feature quantity respectively corresponding to said plurality of reference monitored values except for the abnormal values;

calculating a setting value of the processing parameter in the objective manufacturing process on the basis of a dimension of a processing objective structure in an objective manufacturing process with respect to an objective wafer, and at least one of said plurality of estimated values;

preparing a processing recipe having the setting value described in a processing step in the objective manufacturing process; and processing the objective wafer by the manufacturing apparatus in accordance with the processing recipe.

BRIEF DESCRIPTION OF THE SEVERAL VIEWS OF THE DRAWING

FIG. 2 is a chart showing an example of a process flow for a semiconductor device for use in explanation of the first embodiment of the present invention;

FIG. 3 is a cross-sectional view of a device structure in a manufacturing process for a semiconductor device, for use in explanation of the first embodiment of the present invention;

FIG. 4 is a cross-sectional view of a device structure in a manufacturing process for the semiconductor device following the process of FIG. 3, for use in explanation of the first embodiment of the present invention;

FIG. 5 is a cross-sectional view of a device structure in a manufacturing process for the semiconductor device following the process of FIG. 4, for use in explanation of the first embodiment of the present invention;

FIG. 11 is a chart showing an example of a process flow for the semiconductor device, for use in explanation of a modified example of the first embodiment of the present invention;

FIG. 12 is a cross-sectional view of a device structure in a manufacturing process for a semiconductor device, for use in explanation of a modified example of the first embodiment of the present invention;

FIG. 13 is a cross-sectional view of a device structure in a manufacturing process for the semiconductor device following the process of FIG. 12, for use in explanation of the modified example of the first embodiment of the present invention;

FIG. 14 is a cross-sectional view of a device structure in a manufacturing process for the semiconductor device following the process of FIG. 13, for use in explanation of the modified example of the first embodiment of the present invention;

DETAILED DESCRIPTION OF THE INVENTION

Hereinafter, embodiments of the present invention will be described with reference to the drawings. In the following descriptions of the drawings, portions which are the same or similar to one another are denoted by the same or similar reference numbers. However, the drawings are typical, and attention is to be paid to the fact that a relationship between a thickness and a planar dimension, a ratio among thicknesses of respective layers, and the like are different from those in reality. Accordingly, specific thicknesses and dimensions are to be judged in consideration of the following descriptions. Further, it goes without saying that portions in which a relationship and a ratio among respective dimensions are different from one another are included among the respective drawings.

First Embodiment

Figure 1:
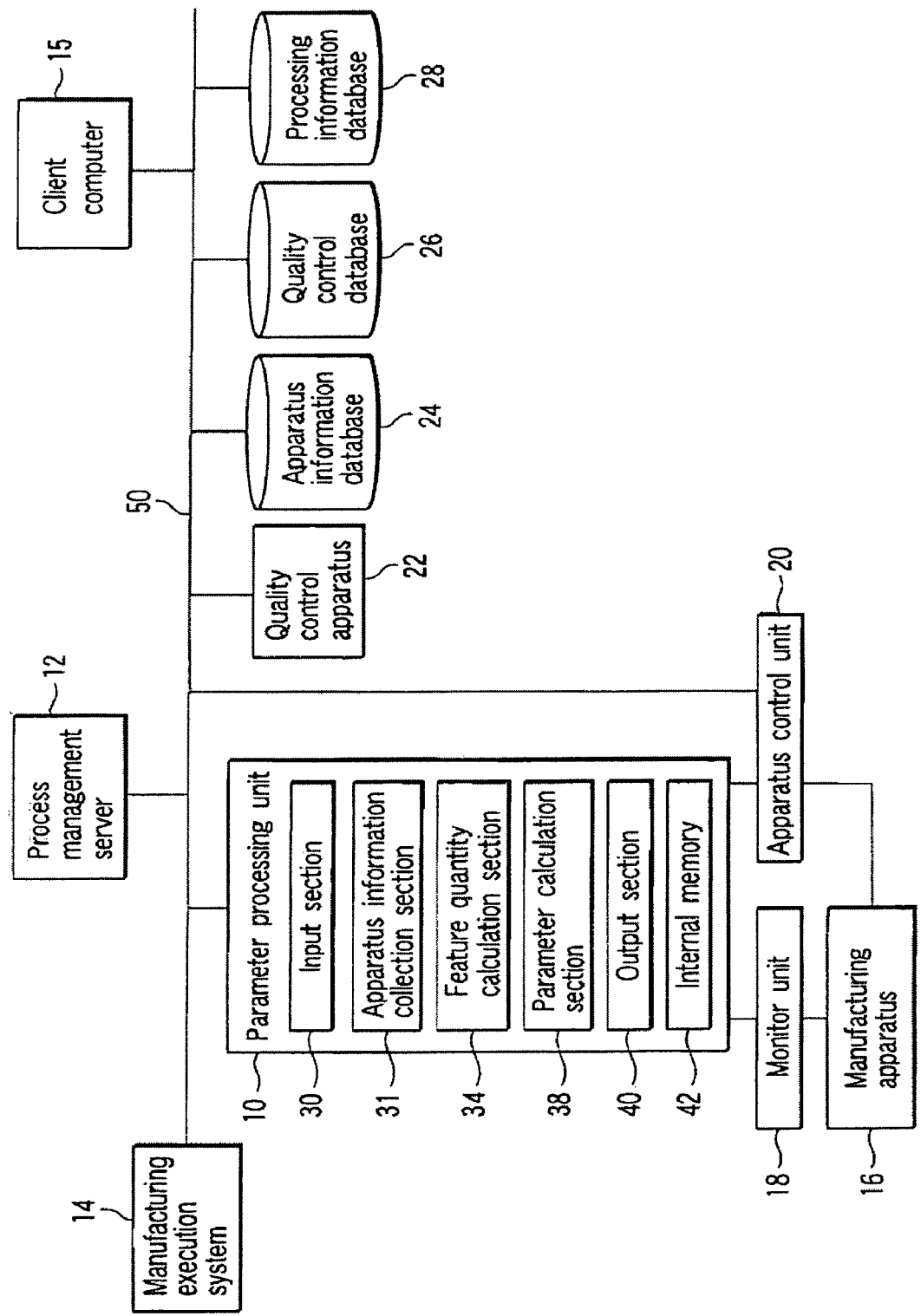
FIG. 1 is a diagram showing an exemplary configuration of a process control system according to a first embodiment of the present invention.

A process control system according to a first embodiment of the present invention comprises, as shown in FIG. 1, a parameter processing unit 10, a process management server 12, a manufacturing execution system 14, a client computer 15, a manufacturing apparatus 16, a monitor unit 18, an apparatus control unit 20, a quality control apparatus 22, an apparatus information database 24, a quality control database 26, and a processing information database 28, etc. Further, the parameter processing unit 10 includes an input section 30, an apparatus information collection section 31, a feature quantity calculation section 34, a parameter calculation section 38, an output section 40, an internal memory 42, etc.

The parameter processing unit 10, the process management server 12, the manufacturing execution system 14, the client computer 15, the apparatus control unit 20, the quality control apparatus 22, the apparatus information database 24, the quality control database 26, the processing information database 28, and the like are connected to one another via communication lines 50 such as a local area network (LAN). The manufacturing apparatus 16 is connected to the parameter processing unit 10 via the monitor unit 18 and the apparatus control unit 20, etc.

For example, a manufacturing process for a semiconductor device is executed by manufacturing apparatus 16 under control of the apparatus control unit 20. The apparatus control unit 20 acquires from the manufacturing execution system 14 a processing recipe in which processing conditions for the manufacturing process such as setting values of a processing parameters of the manufacturing apparatus and the like are described. The manufacturing apparatus 16 includes, for example, a reactive ion etching (RIE) device, a chemical vapor deposition (CVD) device, a deposition device, an ion implantation device, a photolithography system, and the like. Examples of the processing parameters include a time, a temperature, a flow rate, and a pressure.

Further, the monitor unit 18 installed on the manufacturing apparatus 16 monitors apparatus information indicating a processing state of the manufacturing apparatus 16 in operation for a manufacturing process. Examples of the apparatus information include, in a case of an RIE device, an upper electrode position of a variable capacitor of a high-frequency oscillator matching circuit (hereinafter referred to as a capacitor electrode position), a chamber temperature, and an opening of an exhaust valve. The apparatus information collected at the monitor unit 18 are transmitted to the parameter processing unit 10. In addition, the apparatus information are stored in the apparatus information database 24 after wafer numbers of semiconductor devices processed in the manufacturing apparatus 16 are added to the apparatus information.

The quality control apparatus 22 measures quality control measurement values of a finished form and the like after a plurality of manufacturing processes executed at the manufacturing apparatus 16 and the like are respectively completed. Examples of the quality control apparatus 22 include a scanning electron microscope (SEM), a laser microscope, a step meter, and a film thickness meter. Examples of quality control measurement values include finished dimensions such as a width of a resist pattern formed by photolithography or the like, a width and a depth of a pattern etched by RIE or the like, and a thickness of a film deposited by CVD or the like. Further, processed forms such as sidewall angles and line edge roughness (LER) of a resist patter or a line pattern formed by using a resist pattern as a mask are included in quality control measurement values. Quality control data including quality control measurement values measured in the quality control apparatus 22 are stored in the quality control database 24 along with wafer numbers, processing times and setting values of other processing parameters.

The client computer 15 investigates a correlation between apparatus information and a feature quantity in a manufacturing process. For example, the client computer 15 acquires from the apparatus information database 24 and the quality control database 26 a monitored value of apparatus information, a quality control measurement value, and a processing time, etc., with a wafer number of a wafer on which the manufacturing process has been executed in advance in the manufacturing apparatus 16 being as an index. A correlation equation between the apparatus information and the feature quantity is prepared by calculating a feature quantity on the basis of a processing time and a quality control measurement value. As a feature quantity, for example, a slimming rate or an etching rate in RIE, a deposition rate in CVD, or the like is calculated.

The process management server 12 calculates a target value for the processing on the basis of the quality control measurement values according to a finished form of a processing objective structure in the objective manufacturing process among finishes of the manufacturing processes, which have been executed before an objective manufacturing process. Further, with respect to a wafer on which the objective manufacturing process has been executed immediately before an objective wafer, a feature quantity in the objective manufacturing process is calculated. The calculated target value and feature quantity are transmitted to the manufacturing execution system 14.

The manufacturing execution system 14 calculates a processing time required for the manufacturing process on the basis of the acquired target value and feature quantity for the processing. Process specifications for the objective manufacturing process stored in advance in the processing information database 28 are acquired, and the processing for the objective manufacturing process is divided into first and second steps to prepare a processing recipe. In the first and second steps, first and second setting values obtained by dividing a value of the calculated processing time into two are described. As the first step, not only a processing step of the manufacturing process, but also a preliminary step needed for the manufacturing process is included. Moreover, in the processing recipe, there are described items of apparatus information to be monitored, collection conditions for apparatus information such as a sampling rate, a computational procedure of a feature quantity in the manufacturing process, and the like. The processing recipe is transmitted to the parameter processing unit 10 and the apparatus control unit 20.

The input section 30 of the parameter processing unit 10 acquires a correlation between the apparatus information and feature quantity transmitted from the client computer 15, and the processing recipe transmitted from the manufacturing execution system 14. After the manufacturing apparatus 16 starts the processing of the first step in the manufacturing process in accordance with the processing recipe under control of the apparatus control unit 20, the apparatus information collection section 32 collects from the monitor unit 18 monitored values of the apparatus information of the manufacturing apparatus 16 in accordance with the collection conditions described in the processing recipe.

The feature quantity calculation section 36 calculates a feature quantity corresponding to the monitored values of the apparatus information on the basis of a correlation between apparatus information and a feature quantity. The parameter calculation section 38 calculates a new setting value of a processing time for the second step on the basis of the calculated feature quantity and the target value described in the processing recipe. The output section 40 transmits the calculated new setting value to the apparatus control unit 20. The internal memory 42 temporarily stores data in process of calculating or in process of analyzing in an operation in the parameter processing unit 10.

The apparatus control unit 20 changes the processing recipe by describing the received new setting value as a processing time for the second step. The processing of the manufacturing process is controlled in accordance with the changed processing recipe. If a processing time for the second step is not transmitted until the first step is completed, the processing recipe is rewritten by adding an additional step after the first step. When an additional step is added, a processing time for the second step is rewritten by subtracting a processing time for the additional step from the processing time for the second step.

In accordance with the process control system according to the first embodiment of the present invention, the processing for the second step in the manufacturing process is controlled on the basis of a feature quantity calculated in the first step. Accordingly, the processing in the manufacturing process can be controlled with high accuracy, which makes it possible to improve the process capability and a manufacturing yield.

In the first embodiment of the present invention, a semiconductor device, for example, a logic product, under the 90 nm design rule, is manufactured. For ease of explanation, as an example of a manufacturing process to be controlled, there will be described a slimming RIE process in which a width of a resist pattern as a gate electrode forming etching mask of a metal-oxide-semiconductor (MOS) transistor is reduced, by using the process flowchart of FIG. 2 and the process cross-sectional views of FIG. 3 to FIG. 5. A gate length as a gate processed dimension of the MOS transistor is 30 nm.

(a) An oxide film 61 of silicon oxide ($SiO_2$) or the like is formed by thermal oxidation, etc. on a substrate (wafer) 60. A poly-Si film 62 is deposited on the oxide film 61 by a polycrystalline silicon (poly-Si) chemical vapor deposition (CVD) process in step S160. An antireflection coating (ARC) film 63 of silicon oxynitride (SiON), silicon nitride ($Si_3N_4$), titanium nitride (TiN), or the like is deposited on the poly-Si film 62 by an ARCCVD process in step S161.

(b) As shown in FIG. 3, a resist pattern 64 is formed on a surface of the ARC film 63, using a photolithography process in step S162. A resist width Wr of the resist pattern 64 is measured by the quality control apparatus 22 such as a scanning electron microscope (SEM) in a quality control process in step S163.

(c) Etching (slimming RIE) onto the resist pattern 64 and the ARC film 63 is executed by using the RIE device (manufacturing apparatus 16) by RIE, using a mixed gas of carbon tetrafluoride ($CF_4$), oxygen ($O_2$), and hydrogen bromide (HBr) in a slimming RIE process in step S164. As shown in FIG. 4, a mask pattern 65 having resist patterns 64a and ARC patterns 63a is formed. A mask width Ws of the mask pattern 65 is measured by the quality control apparatus 22 in a quality control process in step S165.

(d) In a gate RIE process in step S166, as shown in FIG. 5, the poly-Si film 62 and the oxide film 61 are selectively removed by RIE or the like by using the mask pattern 65 as a mask, to thereby form gate electrodes 62a and gate oxide films 61a. A finished width Wp of the gate electrode 62a is measured by the quality control apparatus 22 in a quality control process in step S167.

Figure 6:
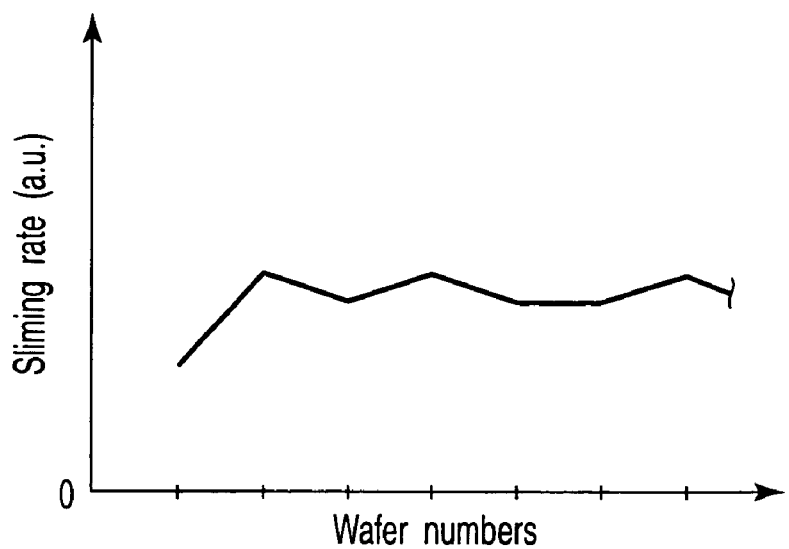
FIG. 6 is a graph showing an example of differences in feature quantity among wafers, for use in explanation of the first embodiment of the present invention.

In the existing slimming RIE process, for example, a slimming time is calculated on the basis of a measured resist width Wr and a slimming rate determined by slimming RIE executed immediately before the calculation in order to control a desired mask width Ws with high accuracy. However, as shown in FIG. 6, a slimming rate may vary among a plurality of wafers processed by the RIE device serving as the manufacturing apparatus 16. When a slimming rate varies, differences are brought about in a slimming amount, which makes it difficult to control the mask width Ws. As a result, the finished width Wp of the gate electrode 62a varies, which deteriorates a process yield.

Figure 8:
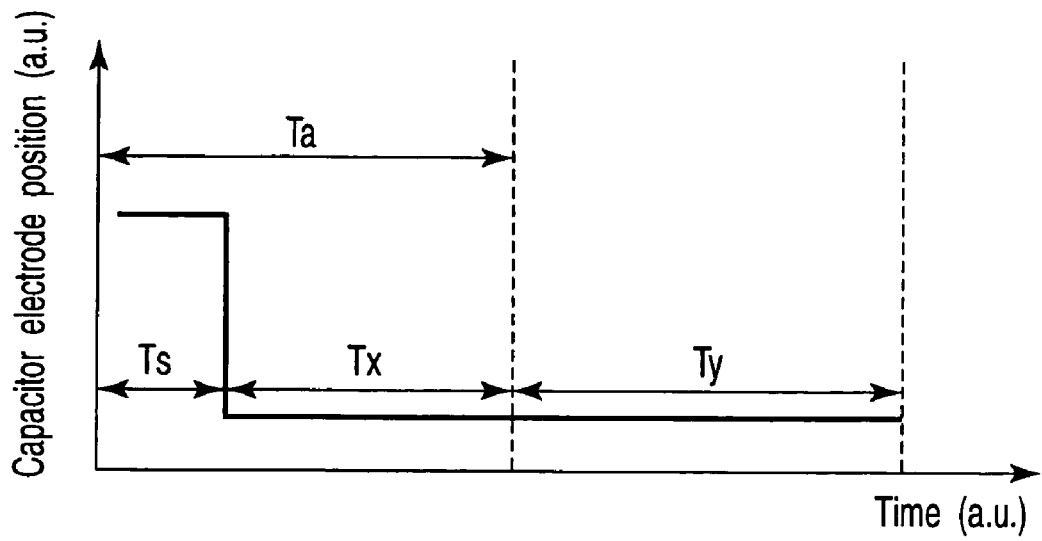
FIG. 8 is a graph showing an example of a processing time of a processing recipe for use in the process control method according to the first embodiment of the present invention.
Figure 9:
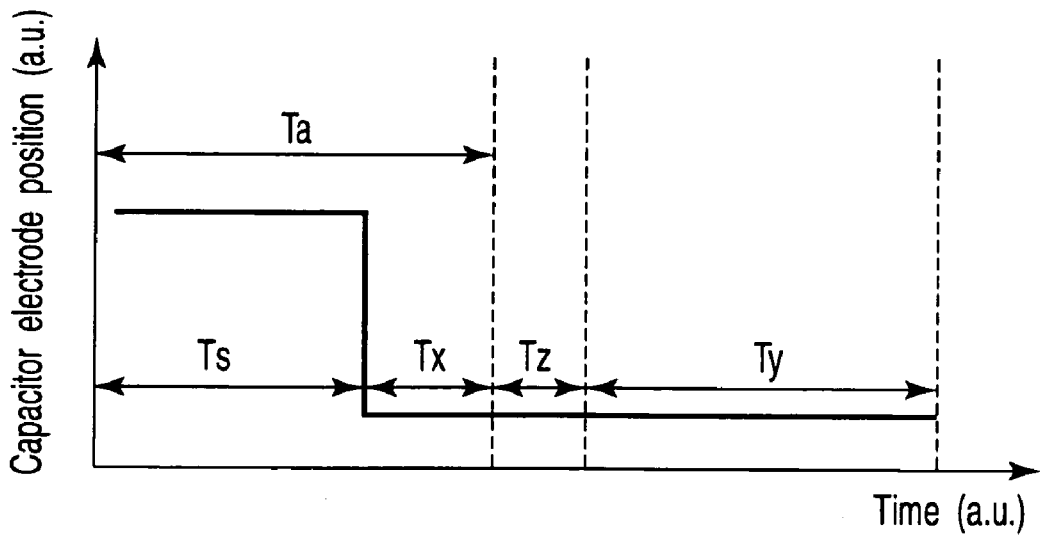
FIG. 9 is a graph showing another example of the processing time of the processing recipe for use in the process control method according to the first embodiment of the present invention.
Figure 10:
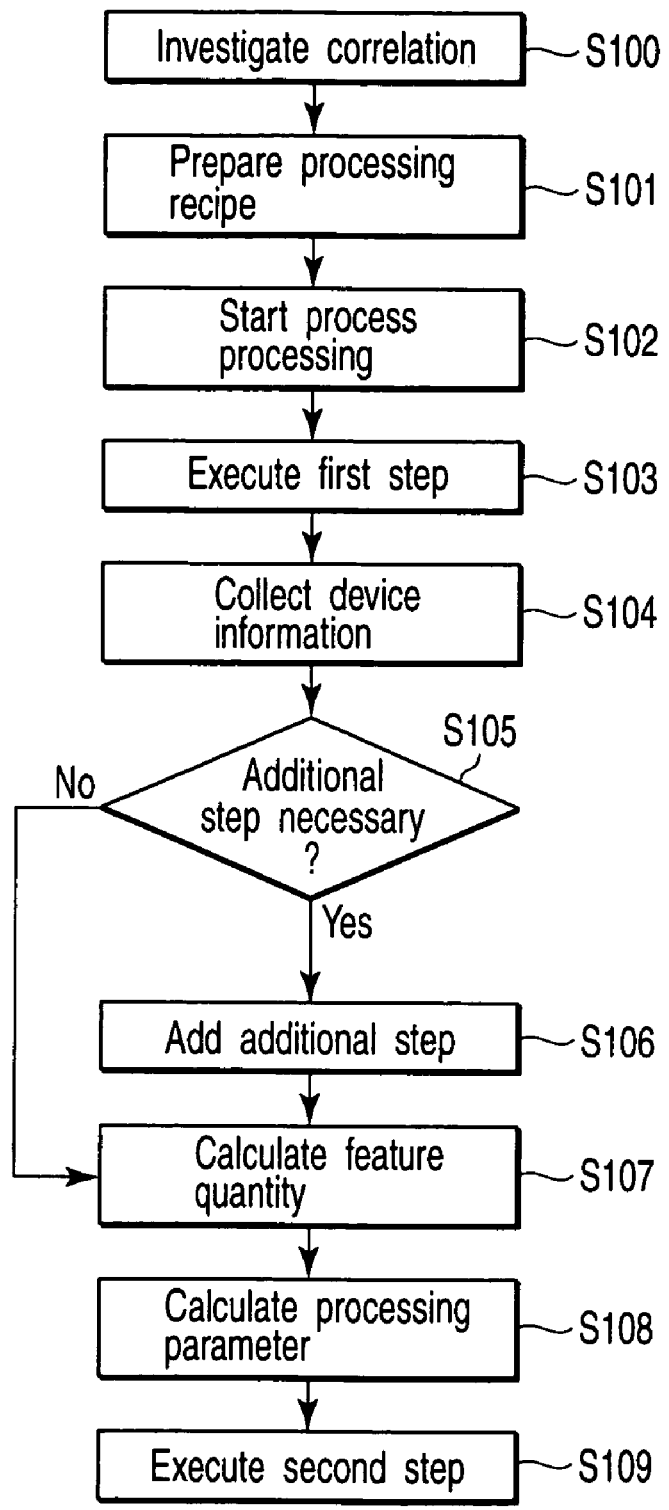
FIG. 10 is a flowchart showing an example of the process control method according to the first embodiment of the present invention.

Now, explanation will be given to a case in which a process control method according to the first embodiment of the present invention is applied to the slimming RIE process described above by use of a correlation between apparatus information and a feature quantity shown in FIG. 7, the timing charts of the manufacturing process shown in FIG. 8 and FIG. 9, and the flowchart shown in FIG. 10.

(a) In step S100, the client computer 15 shown in FIG. 1 calculates a slimming rate for a feature quantity on the basis of quality control measurement values such as a resist width Wr and a mask width Ws, and a processing time serving as a processing parameter in a slimming RIE process executed onto a reference wafer. A slimming rate with respect to a capacitor electrode position as apparatus information is, as shown in FIG. 7, approximated by a linear expression. A correlation equation of the slimming rate with respect to the capacitor electrode position is transmitted to the parameter processing unit 10. A correlation between a feature quantity and apparatus information may be approximated by a polynomial.

(b) In step S101, the process management server 12 calculates a slimming target value in a slimming RIE process with reference to a resist width Wr of a finished form of the resist pattern 64 (processing objective structure) by a photolithography process executed on an objective wafer, and a design specification for the mask pattern 65. Further, a slimming target time is calculated on the basis of the slimming target value with reference to a slimming rate at a wafer immediately before the objective wafer. The calculated slimming target value and slimming target time are transmitted to the manufacturing execution system 14. The manufacturing execution system 14 prepares a processing recipe into which first and second setting values of processing time for the first and second steps in the processing in the slimming RIE process are described, on the basis of the slimming target value and slimming target time. As a first setting value Ta, a value which is less than the slimming target time, for example, half of the target value is described in the processing recipe. As a second setting value, a difference between the slimming target time and the first setting value Ta is described. Note that a variable may be described as a second setting value. The processing recipe is transmitted to the parameter processing unit 10 and the apparatus control unit 20.

(c) In step S102, the first step of the slimming RIE is started in the manufacturing apparatus 16 in accordance with the processing recipe transmitted from the manufacturing execution system 14 to the apparatus control unit 20. In step S103, as shown in FIG. 8, the processing step is started after a preliminary step in the manufacturing process. For example, after a wafer is mounted on the RIE device, a chamber of the RIE device is evacuated and a processing gas is introduced into the chamber within a setup time Ts. The capacitor electrode position of the high-frequency oscillator matching circuit is set to a position standing ready for high-frequency oscillation during the setup time Ts. After a processing gas flow rate and a pressure in the chamber are made stable within predetermined ranges, the capacitor electrode of the high-frequency oscillator matching circuit moves to an oscillation position, and the processing step in the slimming RIE is started. A processing time Tx for the processing step is made to be (Ta-Ts).

(d) In step S104, the apparatus information collection section 32 collects a monitored value of the capacitor electrode position of the manufacturing apparatus 16 from the monitor unit 18 in accordance with the collection conditions described in the processing recipe immediately after starting the processing step. In step S105, the apparatus control unit 20 determines whether or not an additional step is inserted. When the setup time Ts is fortuitously made long, and a processing time for the second step cannot be acquired within the processing time Tx by the apparatus control unit 20, the apparatus control unit 20 adds an additional step for a processing time Tz to the rear of the first step in step S106, as shown in FIG. 9. The additional step is executed after the first step in accordance with the rewritten processing recipe.

Figure 7:
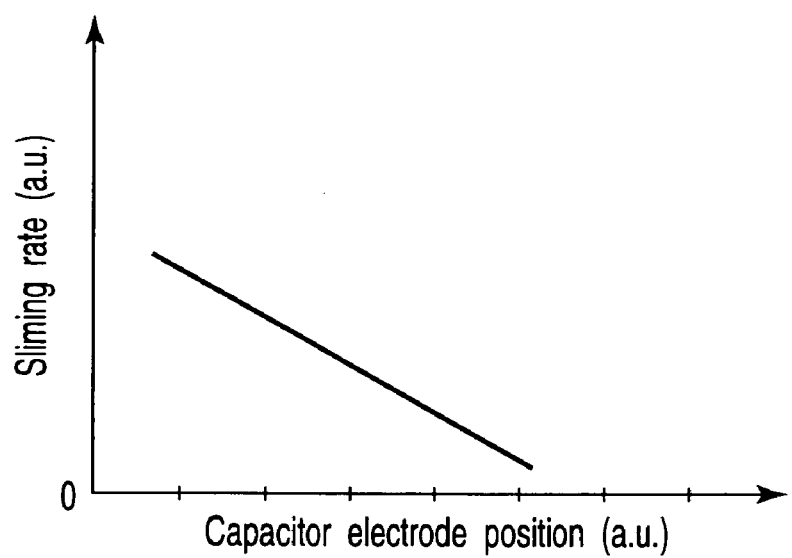
FIG. 7 is a graph showing an example of a correlation between an apparatus parameter and a feature quantity for use in a process control method according to the first embodiment of the present invention.

(e) In step S107, the feature quantity calculation section 36 calculates a slimming rate corresponding to the monitored value of the capacitor electrode position on the basis of the correlation between the capacitor electrode position and the slimming rate shown in FIG. 7. In step S108, the parameter calculation section 38 calculates a second setting value Ty for a processing time for the second step on the basis of the calculated slimming rate. The output section 40 transmits the calculated second setting value Ty to the apparatus control unit 20. The apparatus control unit 20 prepares a processing recipe with the second setting value Ty being as a setting value of the second step described already. The second step is executed following the first step in accordance with the rewritten processing recipe. In this way, the objective wafer is processed by the slimming RIE process.

In accordance with the process control method according to the first embodiment of the present invention, the processing of the second step in the slimming RIE process is controlled on the basis of the slimming rate calculated in the first step. As a result, control accuracy for a finished dimension of the gate electrode 62a is improved, which can decrease logic products below standards. Accordingly, it is possible to control the processing in the slimming RIE process with high accuracy, which makes it possible to improve the process capability and a manufacturing yield.

Modified Example

In a process control method according to a modified example of the first embodiment of the invention, descriptions will be given by using a manufacturing process for a semiconductor device under the 0.13 μm design rule, for example, a DRAM mixed loading logic product as an example. For ease of explanation, as an example of a manufacturing process to be controlled, there will be described a recess RIE process in which a part of an a-Si film embedded in a deep trench at a DRAM portion is removed to an arbitrary depth, with reference to the process flowchart of FIG. 11 and process cross-sectional views of FIG. 12 to FIG. 14.

(a) An oxide film 76 is formed on the surface of a substrate (wafer) 60 by a thermal oxidation process in step S180. A nitride film 77 is deposited on the oxide film 76 by an $Si_3N_4$CVD process in step S181.

(b) A mask pattern such as photo resist is formed on the nitride film 77 in a photolithography process in step S182. In a deep trench RIE process in step S183, deep trenches are formed by selectively removing the nitride film 77, the oxide film 76, and the substrate 60.

(c) An oxide film 78 is deposited in a tetraethoxysilane (TEOS) CVD process in step S184. A trench width Wt of a deep trench (processing objective structure) is measured in a quality control process in step S185.

(d) In an a-SiCVD process in step S186, an a-Si film 79 is embedded in the deep trenches as shown in FIG. 12. In a quality control process in step S187, a film thickness THa of the a-Si film 79 at the flat portion deposited on the surface of the oxide film 78 on the nitride film 77 is measured.

(e) In a recess RIE process in step S188, as shown in FIG. 13, the a-Si film 79 is removed until the surface of the nitride film 77 is exposed while carrying out etching end-point detection by plasma spectroscopy or the like. The recess RIE is continued for a processing time calculated on the basis of the film thickness THa of the a-Si film 79 at the flat portion and an end-point detection time, so that some of the a-Si film 79 is removed from the deep trenches to thereby form recesses at the deep trenches, as shown in FIG. 14. A finished depth Da of the recess is measured in a quality control process in step S189.

In the process control method according to the modified example of the first embodiment of the present invention, the client computer 15 shown in FIG. 1 investigates a correlation between a chamber temperature as apparatus information and an etching rate of the recess RIE with respect to the deep trenches formed by the recess RIE process for a reference wafer in advance while changing the trench width Wt. The process management server 12 calculates a target time for the recess RIE on the basis of the film thickness THa of the a-Si film 79 at the flat portion of the objective wafer, a target value for a recess depth described in the specification, and an etching rate obtained in the adjacent recess RIE process.

The manufacturing execution system 14 divides the processing recipe of the recess RIE into a flat portion processing step, a first step and a second step. In the flat portion processing step, "end-point detection" denoting a time up to the end-point detection for the a-Si film 79 at the flat portion is described. In the first step, a first setting value for a processing time not less than a processing time corresponding to a recess depth is described. As a second setting value, a difference between a target time for the recess RIE from which an etching time onto the flat portion is subtracted and the first setting value is described. The processing recipe is transmitted to the parameter processing unit 10 and the apparatus control unit 20.

The recess RIE process is started in accordance with the processing recipe by the apparatus control unit 20. When the recess RIE process is started, the monitor unit 18 monitors apparatus information such as plasma spectroscopy and a chamber temperature. The apparatus information collection section 32 collects apparatus information in accordance with the processing recipe acquired at the input section 30.

The feature quantity calculation section 36 calculates an etching rate of the recess RIE on the basis of the film thickness THa of the a-Si film 79 at the flat portion and the monitored end-point detection time during the recess RIE process for the objective wafer. The parameter calculation section 38 calculates a depth to be etched in the first step and a second setting value of the second step on the basis of the calculated etching rate in the recess RIE processing after the end-point detection of the a-Si film 79 at the flat portion. The output section 40 transmits the second setting value to the apparatus control unit 20. The apparatus control unit 20 rewrites the processing recipe by describing the acquired second setting value as a setting value of the second step.

In order to control a recess depth more precisely, the apparatus information collection section 32 monitors a chamber temperature in the first step. The feature quantity calculation section 36 calculates an etching rate in the first step on the basis of a relationship between a chamber temperature and an etching rate with respect to a trench width Wt of a deep trench. The parameter calculation section 38 calculates a second setting value of the second step is calculated on the basis of the calculated etching rate in the first step and a specification value of a recess depth. The output section 40 transmits the newly calculated second setting value to the apparatus control unit 20. The apparatus control unit 20 rewrites the newly acquired second setting value as a setting value of the second step.

In the process control method according to the modified example of the first embodiment of the present invention, a processing time for the recess RIE is calculated on the basis of the film thickness THa of the a-Si film 79 at the flat portion and an etching end-point detection time. Moreover, an etching rate at the first step in the recess RIE processing is calculated on the basis of a correlation between chamber temperature and etching rate with respect to a trench width Wt of a deep trench. As a result, control accuracy of a finished recess depth at a deep trench is improved double, and a manufacturing yield can be improved about 2%. Accordingly, the processing in the recess RIE process can be controlled with high accuracy, which makes it possible to improve the process capability and a manufacturing yield.

In the first embodiment of the present invention, as a control objective process, a RIE process such as slimming processing or recess processing is used. However, it may be, for example, a CVD process or the like as a control objective process. Further, the description has been given by using a processing time as a control parameter. However, flow rate, pressure, temperature, or the like may be used as a control parameter. For example, when a flow rate is used as a control parameter, a relationship between a flow rate and a feature quantity is investigated in advance. It suffices to calculate a flow rate corresponding to a feature quantity required in the second step on the basis of a feature quantity calculated in the first step with a processing time for the processing recipe being fixed. Further, finished dimensions such as width, depth, and film thickness of a pattern are used as a finished form. However, a finished form is not limited to dimensions, and may be a processed form such as angles of pattern side walls and LER.

Second Embodiment

Figure 15:
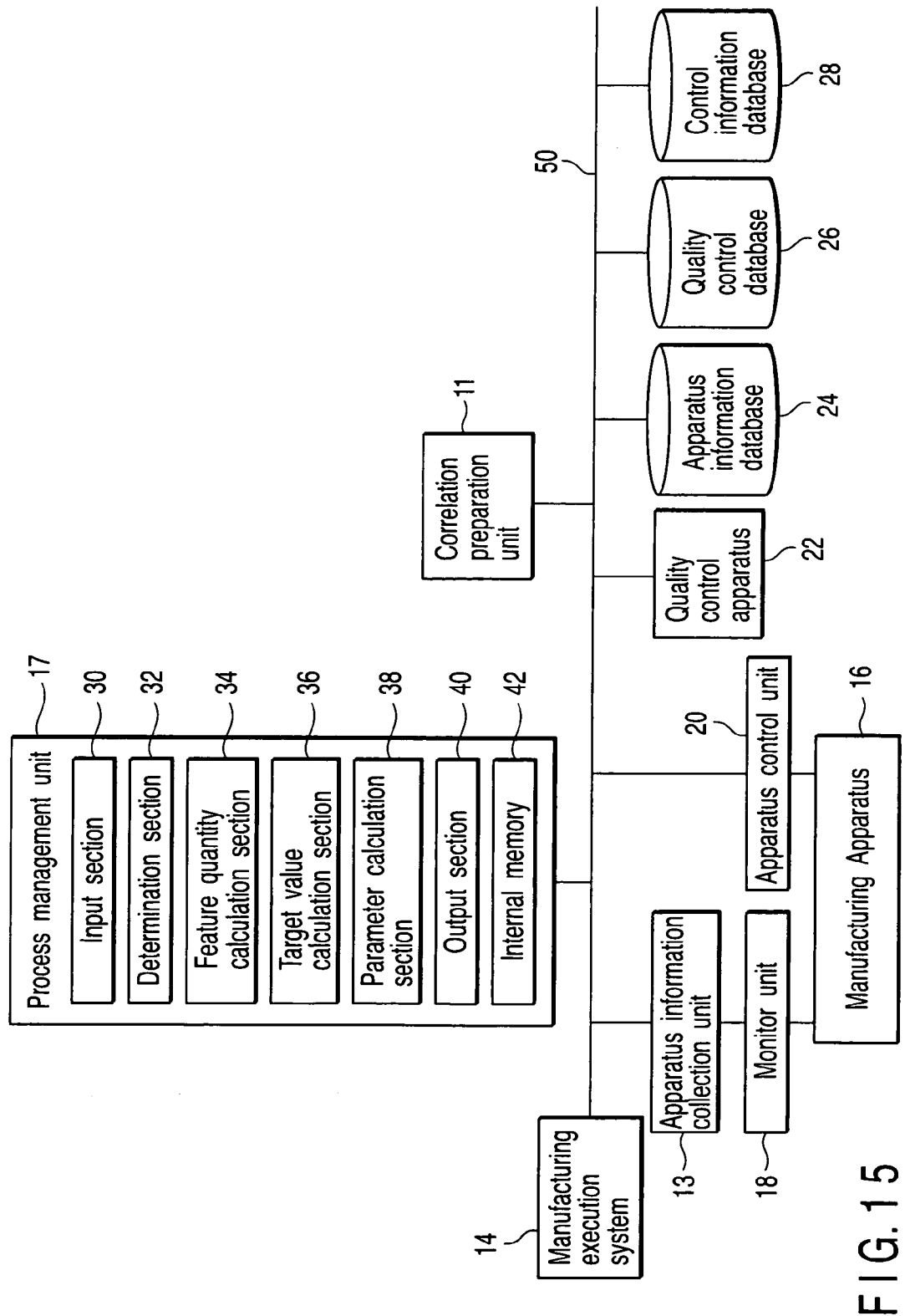
FIG. 15 is a diagram showing an exemplary configuration of a process control system according to a second embodiment of the present invention.

A process control system according to a second embodiment of the present invention comprises, as shown in FIG. 15, an apparatus information collection unit 13, a correlation preparation unit 11, a process management unit 17, a manufacturing execution system 14, a manufacturing apparatus 16, a monitor unit 18, an apparatus control unit 20, a quality control apparatus 22, an apparatus information database 24, a quality control database 26, a control information database 28, and the like. Further, the process management unit 17 includes an input section 30, a determination section 32, a feature quantity calculation section 34, a target value calculation section 36, a parameter calculation section 38, an output section 40, and an internal memory 42.

The apparatus information collection unit 13, the correlation preparation unit 11, the process management unit 17, the manufacturing execution system 14, the apparatus control unit 20, the quality control apparatus 22, the apparatus information database 24, the quality control database 26, the control information database 28, etc. are connected to one another via communication lines 50 such as a local area network (LAN). The monitor unit 18 and the apparatus control unit 20 are connected to the manufacturing apparatus 16. The monitor unit 18 is connected to the apparatus information collection unit 13.

The apparatus information collection unit 13, the correlation preparation unit 11, the process management unit 17, the manufacturing execution system 14, and the apparatus control unit 20 may be configured as a part of a central processing unit (CPU) of a usual computer system. The input section 30, the determination section 32, the feature quantity calculation section 34, the target value calculation section 36, the parameter calculation section 38, and the output section 40 may be configured respectively of dedicated hardware, or may be software having substantially equivalent functions by using a CPU of a usual computer system.

For example, the manufacturing apparatus 16 is used to execute a manufacturing process of a semiconductor device under control of the apparatus control unit 20. The apparatus control unit 20 acquires from the manufacturing execution system 14 a processing recipe in which processing conditions for the manufacturing process such as setting values of processing parameters of the manufacturing apparatus are described. Examples of the manufacturing apparatus 16 include a reactive ion etching (RIE) device, a chemical vapor deposition (CVD) device, a deposition device, an ion implantation device, and a photolithography system. Examples of processing parameters include time, temperature, flow rate, pressure, etc.

Further, the monitor unit 18 provided for the manufacturing apparatus 16 monitors apparatus information indicating a processing state of the manufacturing apparatus 16 in operation for the manufacturing process. A position detector, a power meter, a thermometer, a flowmeter, a pressure gage, and the like are included in the monitor unit 18. Examples of apparatus information include, in a case of an RIE device, upper electrode position of a variable capacitor of a high-frequency oscillator matching circuit (hereinafter referred to as a capacitor electrode position), traveling wave power, reflected wave power, chamber temperature, opening of an exhaust valve, gas flow rate, pressure, etc.

After the manufacturing apparatus 16 starts the processing of the manufacturing process in accordance with the processing recipe under control of the apparatus control unit 20, the apparatus information collection unit 13 collects monitored values of the apparatus information of the manufacturing apparatus 16 from the monitor unit 18 in accordance with the collection conditions described in the processing recipe. The apparatus information are stored in the apparatus information database 24 after lot numbers and wafer numbers of semiconductor devices processed in the manufacturing apparatus 16 are added to the apparatus information. The apparatus information are acquired with respect to all the lots processed in the manufacturing apparatus 16.

The quality control apparatus 22 measures quality control measurement values of finished forms and the like after a plurality of manufacturing processes are respectively completed executed at the manufacturing apparatus 16 and the like. Examples of the quality control apparatus 22 include a scanning electron microscope (SEM), a laser microscope, a step meter, and a film thickness meter. Examples of quality control measurement values include finished dimensions such as width of a resist pattern formed by photolithography or the like, width and a depth of a pattern which is etched by RIE, and thickness of a film deposited by CVD. Further, processed forms such as sidewall angles, line edge roughness (LER), and skirt shape of a resist pattern or a line pattern formed by using or a resist pattern as a mask are included in the quality control measurement values. Quality control data including quality control measurement values measured in the quality control apparatus 22, and the like are stored in the quality control database 24 along with lot numbers, wafer numbers, processing time, and setting values of other processing parameters. The quality control measurement is not executed on all the wafers, but is executed on representative wafers in a lot.

The correlation preparation unit 11 investigates a correlation between apparatus information and a feature quantity in the manufacturing process in advance. For example, the correlation preparation unit 11 calculates a feature quantity on the basis of a processing time in a test manufacturing process with respect to a test wafer and quality control measurement values. A correlation equation between the calculated feature quantity and the apparatus information monitored in the test manufacturing process is prepared. As a feature quantity, for example, a slimming rate or an etching rate in RIE or the like, a sedimentation rate in CVD or the like, and the like are calculated. The correlation is stored in the control information database 28.

The input section 30 of the process management unit 17 acquires monitored values of apparatus information, quality control measurement values, and a processing time, and the like, from the apparatus information database 24 and the quality control database 26, by using, as indexes, lot numbers and wafer numbers of a plurality of reference wafers in a reference lot onto which the manufacturing process has been executed in advance in the manufacturing apparatus 16. Further, the input section 30 of the process management unit 17 acquires from the quality control database 26 the quality control measurement values relating to a finished form of a processing objective structure in an objective manufacturing process among finishes of the manufacturing processes which have been executed before an objective manufacturing process.

The determination section 32 determines an abnormal wafer from among reference wafers on the basis of an abnormal value appearing in a distribution of monitored values of the apparatus information of the plurality of reference wafers.

With respect to a normal wafer in which monitored values of the apparatus information appear within a range of a distribution of the monitored values, a finished form within an allowable range stipulated by a specification of a reference manufacturing process is obtained.

The feature quantity calculation section 34 calculates a plurality of estimated values for a feature quantity corresponding to monitored values of the apparatus information with respect to a plurality of reference wafers except for abnormal wafers, on the basis of a correlation between apparatus information and a feature quantity.

The target value calculation section 36 calculates a target value for the processing on the basis of the quality control measurement values of a processing objective structure of an objective wafer on the basis of the specification for a finished form of the objective manufacturing process.

The parameter calculation section 38 calculates at least one of the plurality of estimated values for a feature quantity and a setting value of a processing parameter in the objective manufacturing process on the basis of the dimensions of the processing objective structure in the objective manufacturing process for the objective wafer. For example, an average value of the plurality of estimated values for a feature quantity of a normal wafer in the reference lot is calculated. A processing parameter in the objective manufacturing process is calculated by use of a shape of the processing objective structure of the objective wafer measured by the quality control apparatus 22, and an average value of the estimated values. One or more lots executed immediately before the objective lot are used as the reference lots.

The output section 40 transmits the calculated setting value of a processing parameter to the manufacturing execution system 14.

The internal memory 42 temporarily stores data in process of calculating or in process of analyzing in an operation in the process management unit 17.

The manufacturing execution system 14 acquires a process specification for the objective manufacturing process stored in advance in the control information database 28, and prepares a processing recipe by describing a setting value of a processing parameter into a processing step of the objective manufacturing process. Further, in the processing recipe, there are described items of the apparatus information to be monitored, collection conditions for the apparatus information such as a sampling rate, a computational procedure of a feature quantity in the manufacturing process, and the like. The processing recipe is transmitted to the apparatus information collection unit 13 and the apparatus control unit 20.

The apparatus control unit 20 controls the objective manufacturing process executed in the manufacturing apparatus 16 with respect to the objective wafer in accordance with the received processing recipe.

In accordance with the process control system according to the second embodiment of the present invention, an abnormal wafer is determined by use of monitored values of apparatus information acquired with respect to all of reference wafers. A processing parameter in the manufacturing process is calculated on the basis of estimated values for a feature quantity of normal wafers except for abnormal wafers. As a result, the processing in the manufacturing process can be controlled with high accuracy, which makes it possible to improve the process capability and a manufacturing yield.

In the second embodiment of the present invention, a semiconductor device under the 90 nm design rule, for example, a logic product is manufactured. For ease of explanation, as an example of a manufacturing process to be controlled, there will be described a slimming RIE process in which a width of a resist pattern of a gate electrode forming etching mask of a metal-oxide-semiconductor (MOS) transistor is reduced, with reference to the process flowchart of FIG. 2 and the process cross-sectional views of FIG. 3 to FIG. 5. A gate length as a gate processed dimension of the MOS transistor is 40 nm.

(a) An oxide film 61 of silicon oxide ($SiO_2$) or the like is formed on a substrate (wafer) 60 by thermal oxidation or the like. A poly-Si film 62 is deposited on the oxide film 61 by a polycrystalline silicon (poly-Si) chemical vapor deposition (CVD) process in step S160. An ARC (antireflection coating) film 63 of silicon oxynitride (SiON), silicon nitride ($Si_3N_4$), titanium nitride (TiN), or the like is deposited on the poly-Si film 62 by an ARCCVD process in step S161. In place of the ARCCVD process, the ARC film 63 may be applied onto the poly-Si film 62 by an antireflection coating process.

(b) As shown in FIG. 3, a resist pattern 64 is formed on a surface of the ARC film 63, using a photolithography process in step S162. A resist width Wr of the resist pattern 64 is measured by the quality control apparatus 22 such as an SEM in a quality control process in step S163.

(c) Etching onto the resist pattern 64 and the ARC film 63 (slimming RIE) is executed by use of the RIE device (manufacturing apparatus 16) by RIE or the like using a mixed gas of carbon tetrafluoride ($CF_4$), oxygen ($O_2$), and hydrogen bromide (HBr) in a slimming RIE process in step S164, so that a mask pattern 65 having resist patterns 64a and ARC patterns 63a is formed, as shown in FIG. 4. A mask width Ws of the mask pattern 65 is measured by the quality control apparatus 22 in a quality control process in step S165.

(d) In a gate RIE process in step S166, the poly-Si film 62 and the oxide film 61 are selectively removed by RIE or the like by using the mask pattern 65 as a mask, to thereby form the gate electrodes 62a and the gate oxide films 61a, as shown in FIG. 5. A finished width Wp of the mask electrode 62a is measured by the quality control apparatus 22 in a quality control process in step S167.

In the existing slimming RIE process, for example, a slimming rate is calculated on the basis of the results of quality control measurement in the slimming RIE process executed onto a plurality of wafers in order to control a desired mask width Ws with high accuracy. A slimming time is calculated on the basis of a resist width Wr measured with respect to the objective wafer and a determined slimming rate. However, some of the plurality of wafers processed in the RIE device may be made to be abnormal wafers showing abnormal values whose slimming rates excess an allowable range. When quality control measurement includes abnormal wafers, a calculated slimming rate is made inaccurate, which makes it difficult to control the mask width Ws. As a result, the finished width Wp of the gate electrodes 62a gets out of the control range, which deteriorates a process yield.

Figure 16:
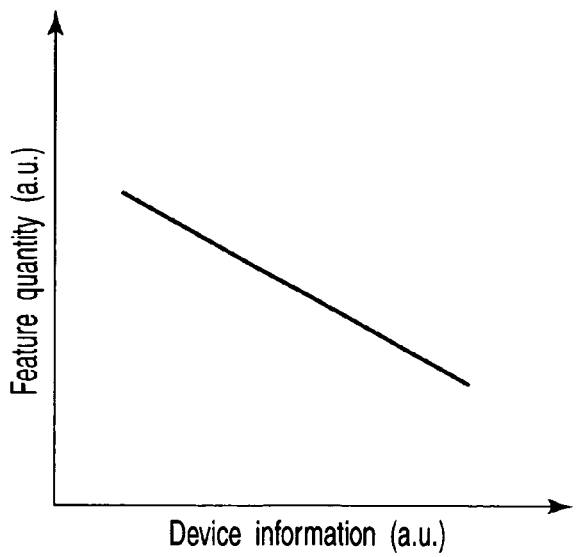
FIG. 16 is a graph showing an example of a correlation between an apparatus parameter and a feature quantity for use in a process control method according to the second embodiment of the present invention.
Figure 17:
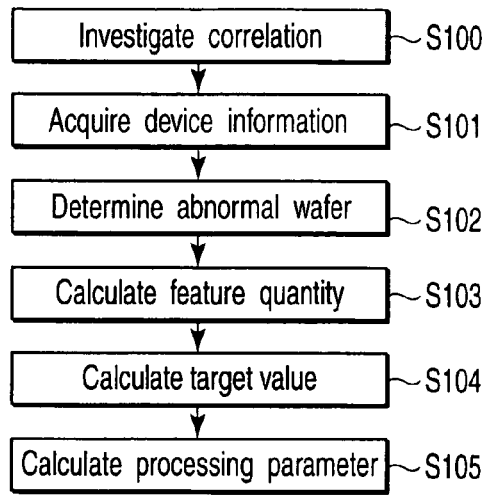
FIG. 17 is a flowchart showing an example of the process control method according to the second embodiment of the present invention.

Now, explanation will be given to a case in which the process control method according to the second embodiment of the present invention is applied to the slimming RIE process described above with reference to a correlation between apparatus information and a feature quantity shown in FIG. 16, and the flowchart shown in FIG. 17.

(a) In step S100, the correlation preparation unit 11 of the system shown in FIG. 15 acquires from the quality control database 26 quality control measurement values such as the resist width Wr and the mask width Ws, and a processing time serving as a processing parameter in the slimming RIE process executed onto the reference wafers. A slimming rate for a feature quantity is calculated on the basis of the quality control measurement values and the processing parameter. For example, as shown in FIG. 16, a slimming rate with respect to a capacitor electrode position as apparatus information is approximated by a linear expression. A correlation equation of a feature quantity with respect to apparatus information is stored in the control information database 28.

(b) In step S101, the input section 30 acquires from the apparatus information database 24 monitored values of apparatus information monitored during the processing step of the slimming RIE onto the plurality of reference wafers. Further, a correlation between apparatus information and a feature quantity is acquired from the control information database 28.

(c) In step S102, the determination section 32 determines an abnormal wafer on the basis of an abnormal value appearing in a distribution of monitored values of the apparatus information of the reference wafers.

(d) In step S103, the feature quantity calculation section 34 calculates estimated values for a slimming rate for a feature quantity corresponding to the monitored values of the apparatus information except for abnormal values, on the basis of a correlation between apparatus information and a feature quantity. With respect to the reference wafers onto which quality control measurement has been executed, a value of a slimming rate calculated on the basis of quality control measurement values acquired from the quality control database 26 and a processing parameter may be used to be replaced with an estimated value.

(e) In step S104, the quality control apparatus 22 measures a resist width Wr of a finished form of the resist pattern 64 (processing objective structure) by a photolithography process executed onto an objective wafer, and the measured resist width Wr is stored as a quality control measurement value in the quality control database 26. The resist width Wr and a design specification for the mask pattern 65 are respectively acquired from the quality control database 26 and the control information database 28 by the input section 30 of the process management unit 17. The target value calculation section 36 calculates a slimming target value in the slimming RIE process with reference to the resist width Wr and the design specification for the mask pattern 65.

(f) In step S105, the parameter calculation section 38 calculates a slimming time as a processing parameter on the basis of a slimming target value by using an average value of the estimated values for a slimming rate. The calculated slimming time is transmitted to the manufacturing execution system 14 via the output section 40.

(g) A processing recipe is prepared by describing the acquired slimming time as a setting value of a processing time in the slimming RIE process by the manufacturing execution system 14. The processing recipe is transmitted to the apparatus information collection unit 13 and the apparatus control unit 20. The processing of the slimming RIE is started in the manufacturing apparatus 16 in accordance with the processing recipe transmitted from the manufacturing execution system 14 to the apparatus control unit 20.

In accordance with the process control method according to the second embodiment of the present invention, monitored values of apparatus information acquired with respect to all of reference wafers are used as estimated values for a slimming rate. Accordingly, it is possible to determine an abnormal wafer showing an abnormal value among the reference wafers. A processing time in the slimming RIE process is calculated on the basis of the estimated values for a slimming rate of normal wafers except for abnormal wafers. As a result, control accuracy for a finished dimension of the gate electrode 62a is improved, which can decrease logic products below standards. Consequently, it is possible to control the processing in the slimming RIE process with high accuracy, which makes it possible to improve the process capability and a manufacturing yield.

In the above-described descriptions, the case in which the manufacturing process is carried out by lot processing has been described. However, the manufacturing process may be sheet processing. In a case of sheet processing, it suffices to use an estimated value of a slimming rate for a normal wafer processed immediately before the objective manufacturing process. In addition, an average value of estimated values of a slimming rate for a plurality of normal wafers processed immediately before the objective manufacturing process may be used.

In the present embodiment of the invention, as a control objective process, a RIE process such as slimming processing or recess processing is used. However, it may be, for example, a CVD process or the like as a control objective process. Further, the description has been given by using a processing time as a control parameter. However, flow rate, pressure, temperature, or the like may be used as a control parameter. For example, when a flow rate is used as a control parameter, a relationship between a flow rate and a feature quantity is investigated in advance. It suffices to calculate a flow rate corresponding to a feature quantity required in the objective manufacturing process on the basis of an estimated value of a feature quantity calculated in the reference manufacturing process with a processing time for the processing recipe being fixed.

In addition, a correlation between apparatus information and a feature quantity is approximated, using a monomial. However, a feature quantity may depend on plural apparatus information. In such a case, a correlation of a feature quantity with respect to plural items of apparatus information is approximated by a polynomial.

Third Embodiment

Figure 18:
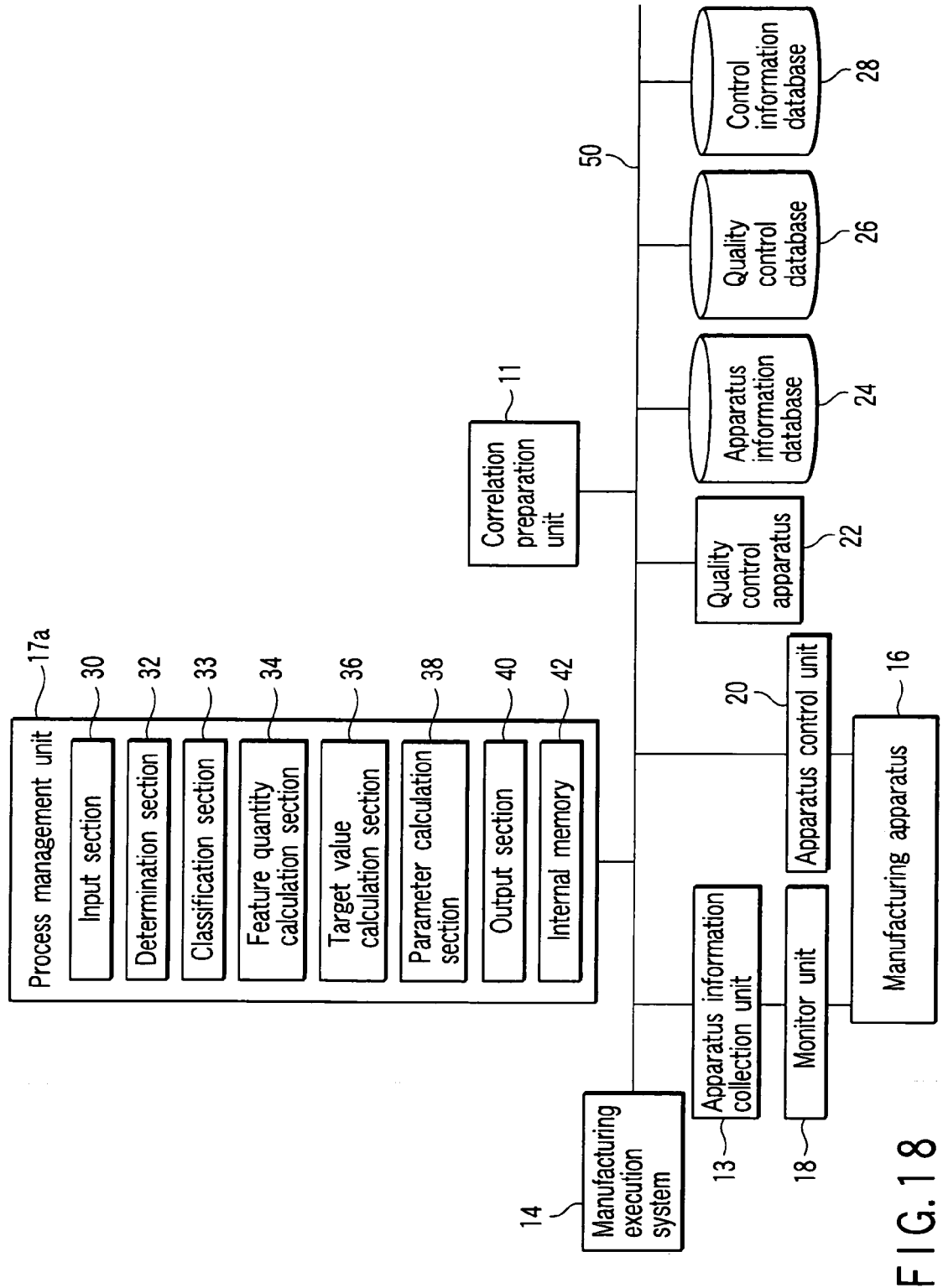
FIG. 18 is a diagram showing an exemplary configuration of a process control system according to a third embodiment of the present invention.

A process control system according to a third embodiment of the present invention comprises, as shown in FIG. 18, an apparatus information collection unit 13, a correlation preparation unit 11, a process management unit 17a, a manufacturing execution system 14, a manufacturing apparatus 16, a monitor unit 18, an apparatus control unit 20, a quality control apparatus 22, an apparatus information database 24, a quality control database 26, a control information database 28, and the like. Further, the process management unit 17a includes an input section 30, a determination section 32, a classification section 33, a feature quantity calculation section 34, a target value calculation section 36, a parameter calculation section 38, an output section 40, and an internal memory 42.

The process control system according to the third embodiment of the present invention is different from the first embodiment in that the classification section 33 is provided in the process management unit 17a. Because the other configurations are the same as those in the first embodiment, overlapped descriptions will be omitted.

For example, the RIE device forms different adherents or matters on the wall surface of a processing chamber in a manufacturing process executed in accordance with a processing recipe different from a processing recipe in the objective manufacturing process. In a manufacturing process executed immediately after the manufacturing process in accordance with the different processing recipe, an atmosphere in the processing chamber is changed during the processing due to degasification from the adherents or matters on the wall surface of the processing chamber. As a result, a monitored value of apparatus information is deviated from a normal value to be an abnormal value. Further, an etching rate serving as a feature quantity, and a finished form by the manufacturing process vary.

In a manufacturing process executed under certain conditions as described above, an abnormal value of apparatus information appears at a given distribution position shifted from a distribution position of normal monitored values with favorable reproducibility. In addition, variations in an etching rate, a finished form, and the like are reproduced.

Figure 19:
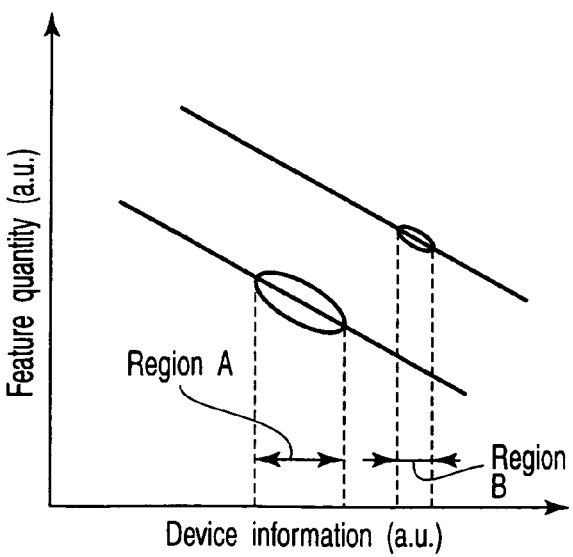
FIG. 19 is a graph showing an example of a correlation between an apparatus parameter and a feature quantity for use in a process control method according to the third embodiment of the present invention.

For example, as shown in FIG. 19, in a normal wafer, monitored values of apparatus information distribute in a region A. Estimated values for a feature quantity of a normal wafer distribute in a region including a straight line approximating a correlation between apparatus information and a feature quantity within a range corresponding to the region A. Further, abnormal values of apparatus information obtained in a manufacturing process executed under certain conditions distribute in a region B with favorable reproducibility. Estimated values for a feature quantity calculated on the basis of quality control measurement values also distribute within a given range so as to correspond to the region B of apparatus information.

The classification section 33 of the process management unit 17a classifies abnormal values reproduced by a distribution region appearing in abnormal values of apparatus information determined by the determination section 32, into the abnormal mode corresponding to the distribution region. For example, an abnormal wafer that an abnormal value of apparatus information appears in the region B is classified into the abnormal mode corresponding to the region B, and is stored in the control information database 28. When abnormal values of apparatus information appear in not only the region B but also a plurality of regions, the respective abnormal values are classified into a plurality of abnormal modes corresponding to the plurality of regions.

The correlation preparation unit 11 investigates a correlation between apparatus information and a feature quantity with respect to the abnormal mode corresponding to the region B. As shown in FIG. 19, a new approximate expression of a correlation between apparatus information and a feature quantity with respect to the abnormal mode is prepared. The correlation in the abnormal mode is stored in the control information database 28.

In the third embodiment of the present invention, the manufacturing execution system 14 prepares a processing recipe in such a manner that the processing of an objective manufacturing process is divided into first and second steps. In the first and second steps, there are described first and second setting values obtained by dividing a value of a processing time calculated by using a normal wafer in the parameter calculation section 38 of the process management unit 17a into two values. A processing parameter is transmitted to the apparatus control unit 20 and the apparatus information collection unit 13.

During the processing of the first step in the manufacturing process in the manufacturing apparatus 16, monitored values of apparatus information collected by the apparatus information collection unit 13 are transmitted to the process management unit 17a in real time. When the determination section 32 determines a monitored value of apparatus information as normal, the processings of the first and second steps in the processing recipe are executed in accordance with the processing recipe.

When a monitored value of apparatus information is determined as abnormal, the classification section 33 classifies the abnormal value of apparatus information, and determines whether or not it corresponds to the abnormal mode. When it is determined as the abnormal mode, the feature quantity calculation section 34 reads out a correlation in the abnormal mode from the control information database 28, and calculates an estimated value of a feature quantity. The parameter calculation section 38 calculates a new setting value of the processing parameter on the basis of the estimated value of the feature quantity corresponding to the abnormal mode. The apparatus control unit 20 changes the processing parameter of the second step in the processing recipe on the basis of the new setting value received from the output section 40.

In accordance with the process control system according to the third embodiment of the present invention, a monitored value of apparatus information is classified on the basis of the abnormal value when it is determined as an abnormal value. In an abnormal wafer classified into the abnormal mode, the processing of the second step in the manufacturing process is controlled by using an estimated value of a feature quantity calculated on the basis of a correlation in the abnormal mode. Accordingly, the processing in the manufacturing process can be controlled with high accuracy, which makes it possible to improve the process capability and a manufacturing yield.

Figure 20:
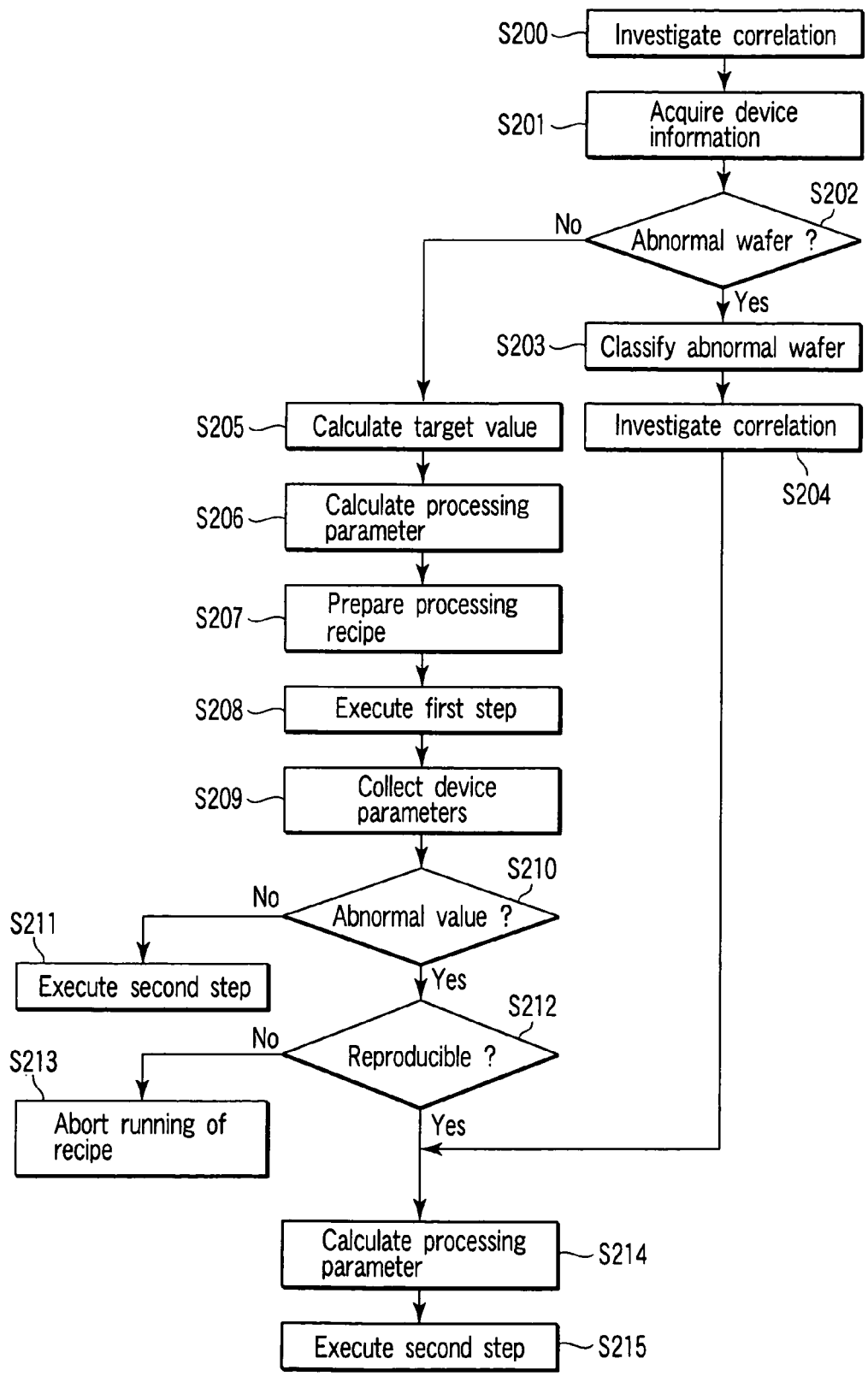
FIG. 20 is a flowchart showing an example of the process control method according to the third embodiment of the present invention.

Now, explanation will be given to a case in which the process control method according to the third embodiment of the present invention is applied to the slimming RIE process shown in FIG. 2 to FIG. 5 with reference to the flowchart shown in FIG. 20

(a) In step S200, the correlation preparation unit 11 shown in FIG. 18 calculates a slimming rate for a feature quantity on the basis of quality control measurement values such as a resist width Wr and a mask width Ws, and a processing time serving as a processing parameter in the slimming RIE process executed onto a test wafer. The correlation of a feature quantity with respect to the apparatus information is transmitted to the control information database 28.

(b) In step S201, the input section 30 acquires from the apparatus information database 24 monitored values of the apparatus information monitored during the processing step of the slimming RIE onto the reference wafers. Further, a correlation between apparatus information and a feature quantity is acquired from the control information database 28.

(c) In step S202, the determination section 32 determines abnormal wafers whose monitored values of apparatus information are made abnormal among the reference wafers.

(d) When it is determined as an abnormal wafer, the classification section 33 classifies, in step S203, the abnormal wafers having abnormal values reproduced by a distribution region appearing in abnormal values into the abnormal mode.

(e) In step S204, the correlation preparation unit 11 prepares a correlation between apparatus information and a feature quantity by use of a calculated value of a feature quantity and monitored values of apparatus information with respect to the abnormal wafers in the abnormal mode classified to have reproducibility of correlation.

(f) Among the normal wafers except for the abnormal wafers, the feature quantity calculation section 34 calculates, in step S205, an estimated value of a slimming rate for a feature quantity corresponding to the monitored values of apparatus information on the basis of the correlation between apparatus information and a feature quantity. The input section 30 of the process management unit 17a acquires the resist width Wr of the resist pattern 64 (processing objective structure) and a design specification for the mask pattern 65 from the quality control database 26 and the control information database 28, respectively. The target value calculation section 36 calculates a slimming target value in the slimming RIE process with reference to the resist width Wr and the design specification for the mask pattern 65.

(g) In step S206, the parameter calculation section 38 calculates a slimming time as a processing parameter on the basis of the slimming target value by use of an average value of the estimated values of a slimming rate for a normal wafer. The calculated slimming time is transmitted to the manufacturing execution system 14 via the output section 40.

(h) In step S207, the manufacturing execution system 14 prepares a processing recipe in such a manner that the processing step in the objective manufacturing process is divided into a first step and a second step. First and second setting values obtained by dividing the value of the received slimming time into two values are described in the first and second steps. The processing recipe is transmitted to the apparatus information collection unit 13 and the apparatus control unit 20.

(i) In step S208, the first step of the slimming RIE is started with the first setting value in the manufacturing apparatus 16 in accordance with the processing recipe under control of the apparatus control unit 20.

(j) In step S209, at the same time as the first step is started, the apparatus information collection unit 13 collects the apparatus information monitored on the monitor unit 18. The monitored values of the apparatus information are transmitted to the process management unit 17a in real time.

(k) In step S210, the determining section 32 determines whether or not the monitored values of the apparatus information are normal values. When a monitored value is a normal value, the second step is processed with the second setting value in step S211 following the first step.

(l) When a monitored value of apparatus information is an abnormal value, the classification section 33 classifies the abnormal value in step S212, and it is determined whether or not it is the abnormal mode with reproducibility. When it is not the abnormal mode with reproducibility, the running of the processing recipe is aborted in step S213. Thereafter, the following handling is determined by analyzing the abnormal cause.

(m) When it is the abnormal mode with reproducibility, the feature quantity calculation section 34 calculates, in step S214, an estimated value of a feature quantity on the basis of a correlation between apparatus information and a feature quantity in the abnormal mode. The parameter calculation section 38 calculates a new setting value as a processing parameter on the basis of the estimated value of a feature quantity corresponding to the abnormal mode. The new setting value as a processing parameter is transmitted to the apparatus control unit 20.

(n) In step S215, the apparatus control unit 20 changes the second setting value of the second step in the processing recipe on the basis of the new setting value as a processing parameter.

In accordance with the process control method according to the third embodiment of the present invention, the processing of the second step in the slimming RIE process in a wafer in which an abnormal value is detected is controlled on the basis of a slimming rate calculated on the basis of the abnormal value during the process of the first step. As a result, control accuracy for a finished dimension of the gate electrode 62a is improved, which can decrease logic products below standards. In this way, it is possible to control the processing in the slimming RIE process with high accuracy, which makes it possible to improve the process capability and a manufacturing yield.

In the present embodiment of the invention, as a control objective process, a RIE process such as slimming processing or recess processing is used. However, it may be, for example, a CVD process or the like as a control objective process. Further, the description has been given by using a processing time as a control parameter. However, flow rate, pressure, temperature, or the like may be used as a control parameter. For example, when a flow rate is used as a control parameter, a relationship between a flow rate and a feature quantity is investigated in advance. It suffices to calculate a flow rate corresponding to a feature quantity required in the objective manufacturing process on the basis of an estimated value of a feature quantity calculated in the reference manufacturing process with a processing time for the processing recipe being fixed.

In addition, a correlation between apparatus information and a feature quantity is approximated, using a monomial. However, a feature quantity may depend on plural apparatus information. In such a case, a correlation of a feature quantity with respect to plural items of apparatus information is approximated by a polynomial.

It will be understood from the explanations as above that the present invention may be applied to a method of manufacturing a liquid crystal apparatus, a magnetic recording medium, an optical recording medium, a thin film magnetic head, a superconducting device, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A process control system comprising:

a monitor unit which monitors apparatus information indicating a processing state of a manufacturing apparatus;

an apparatus information collection unit which collects a monitored value of the apparatus information from the monitor unit in operation of a manufacturing process;

a correlation preparation unit which prepares a correlation between a test monitored value of the apparatus information in a test manufacturing process with respect to a test wafer, and a feature quantity obtained from a processing parameter for controlling the manufacturing apparatus and a finished form in the test manufacturing process;

a process management unit which calculates a setting value of the processing parameter in an objective manufacturing process on the basis of at least one of a plurality of estimated values of the feature quantity in combination with a dimension of a processing objective structure in the objective manufacturing process with respect to an objective wafer, said plurality of estimated values being calculated, on the basis of the correlation prepared by the correlation preparation unit, with respect to a plurality of reference monitored values of the apparatus information except for abnormal values in a distribution of said plurality of reference monitored values in a reference manufacturing process with respect to a plurality of reference wafers; and an apparatus control unit which controls the manufacturing apparatus in accordance with a processing recipe in which the setting value is described in a processing step in the objective manufacturing process, wherein the process management unit determines abnormal values in a distribution of said plurality of reference monitored values; classifies abnormal values which are reproduced by an appearance distribution region among the abnormal values determined in the distribution of the reference monitored values into an abnormal mode; and prepares a new correlation between the abnormal value of a first abnormal wafer classified into the abnormal mode, and a feature quantity calculated on the basis of a finished form of the first abnormal wafer.

2. The process control system according to claim 1, wherein the processing parameter includes a time, a temperature, a flow rate, and a pressure.

3. The process control system according to claim 1, wherein the finished form includes finished dimensions of a width and a depth of a pattern, a finished dimension of a thickness of the pattern, an angle of a sidewall of the pattern, and a line edge roughness of the pattern.

4. The process control system according to claim 1, wherein the process management unit calculates, when a new monitored value of the apparatus information collected while processing the objective wafer in accordance with the processing recipe is classified into the abnormal mode, a new estimated value of the feature quantity corresponding to the new monitored value on the basis of the new correlation; calculates a new setting value of the processing parameter on the basis of a dimension of the processing objective structure and the new estimated value; and changes the setting value of a processing step in the processing recipe on the basis of the new setting value.

5. A process control method comprising:
preparing, by executing a test manufacturing process with respect to a test wafer, a correlation between a test monitored value of apparatus information indicating a processing state of a manufacturing apparatus and a feature quantity obtained from a processing parameter for controlling the manufacturing apparatus and a finished form in the test manufacturing process;
acquiring, by executing a reference manufacturing process with respect to a plurality of reference wafers, a plurality of reference monitored values of the apparatus information with respect to said plurality of reference wafers;
determining abnormal values in a distribution of said plurality of reference monitored values;
calculating on the basis of the correlation a plurality of estimated values of the feature quantity respectively corresponding to said plurality of reference monitored values except for the abnormal values;
calculating a setting value of the processing parameter in objective manufacturing process on the basis of a dimension of a processing objective structure in the objective manufacturing process with respect to an objective wafer, and at least one of said plurality of estimated values;
preparing a processing recipe in which the setting value is described in a processing step in the objective manufacturing process;
classifying abnormal values which are reproduced by an appearance distribution region among the abnormal values determined in the distribution of the reference monitored values into an abnormal mode; and
preparing a new correlation between the abnormal value of a first abnormal wafer classified into the abnormal mode, and a feature quantity calculated on the basis of a finished form of the first abnormal wafer.

6. The process control method according to claim 5, wherein the processing parameter includes a time, a temperature, a flow rate, and a pressure.

7. The process control method according to claim 5, wherein the finished form includes finished dimensions of a width and a depth of a pattern, a finished dimension of a thickness of the pattern, an angle of a sidewall of the pattern, and a line edge roughness of the pattern.

8. The process control method according to claim 5, further comprising:

calculating, when a new monitored value of the apparatus information collected while processing the objective wafer in accordance with the processing recipe is classified into the abnormal mode, a new estimated value of the feature quantity corresponding to the new monitored value on the basis of the new correlation;
calculating a new setting value of the processing parameter on the basis of a dimension of the processing objective structure and the new estimated value; and
changing the setting value of a processing step in the processing recipe on the basis of the new setting value.

9. A method of manufacturing an electronic apparatus, comprising:
preparing, by executing a test manufacturing process with respect to a test wafer, a correlation between a test monitored value of apparatus information indicating a processing state of a manufacturing apparatus, and a feature quantity obtained from a processing parameter for controlling the manufacturing apparatus and a finished form in the test manufacturing process;
collecting, by executing a reference manufacturing process with respect to a plurality of reference wafers, a plurality of reference monitored values of the apparatus information with respect to said plurality of reference wafers;
determining abnormal values in a distribution of said plurality of reference monitored values;
calculating on the basis of the correlation a plurality of estimated values of the feature quantity respectively corresponding to said plurality of reference monitored values except for the abnormal values;
calculating a setting value of the processing parameter in an objective manufacturing process on the basis of a dimension of a processing objective structure in the objective manufacturing process with respect to an objective wafer, and at least one of said plurality of estimated values;
preparing a processing recipe in which the setting value described is in a processing step in the objective manufacturing process;
processing the objective wafer by the manufacturing apparatus in accordance with the processing recipe;
classifying abnormal values which are reproduced by an appearance distribution region among the abnormal values determined in the distribution of the reference monitored values into an abnormal mode; and
preparing a new correlation between the abnormal value of a first abnormal wafer classified into the abnormal mode, and a feature quantity calculated on the basis of a finished form of the first abnormal wafer.

10. The method of manufacturing an electronic apparatus according to claim 9, wherein the processing parameter includes a time, a temperature, a flow rate, and a pressure.

11. The method of manufacturing an electronic apparatus according to claim 9, further comprising:
calculating, when a new monitored value of the apparatus information collected while processing the objective wafer in accordance with the processing recipe is classified into the abnormal mode, a new estimated value of the feature quantity corresponding to the new monitored value on the basis of the new correlation;
calculating a new setting value of the processing parameter on the basis of a dimension of the processing objective structure and the new estimated value; and
changing the setting value of a processing step in the processing recipe on the basis of the new setting value.

* * * * *

UNITED STATES PATENT AND TRADEMARK OFFICE
CERTIFICATE OF CORRECTION

PATENT NO. : 7,596,421 B2
APPLICATION NO. : 11/471675
DATED : September 29, 2009
INVENTOR(S) : Sugamoto et al.

It is certified that error appears in the above-identified patent and that said Letters Patent is hereby corrected as shown below:

Claim 5, column 23, line 42, change "objective" to --an objective--.

Signed and Sealed this

Eighth Day of December, 2009

David J. Kappos
*Director of the United States Patent and Trademark Office*